(12) United States Patent
Marchlewski et al.

(10) Patent No.: US 9,758,199 B1
(45) Date of Patent: Sep. 12, 2017

(54) STIFFENING BRACE FOR PICKUP TRUCK BOX OUTER PANEL

(71) Applicant: Ford Global Technologies, LLC, Dearborn, MI (US)

(72) Inventors: Jack Marchlewski, Saline, MI (US); Joshua R. Hemphill, White Lake, MI (US); Robert Reiners, Grosse Ile, MI (US); John Comiez, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/245,297

(22) Filed: Aug. 24, 2016

(51) Int. Cl.
*B62D 33/023* (2006.01)

(52) U.S. Cl.
CPC .................. *B62D 33/023* (2013.01)

(58) Field of Classification Search
CPC .................................................. B62D 33/023
USPC .......................................... 296/183.1, 186.1
See application file for complete search history.

(56) References Cited

U.S. PATENT DOCUMENTS

| | | | | |
|---|---|---|---|---|
| 6,142,549 A * | 11/2000 | Clare | ...................... | B60R 11/06 224/404 |
| 6,474,725 B2 | 11/2002 | Sotiroff et al. | | |
| 6,702,365 B2 * | 3/2004 | Semple | .................. | B62D 33/02 296/183.1 |
| 7,431,368 B2 * | 10/2008 | Henderson | ................ | B60R 5/00 296/37.6 |
| 7,665,800 B2 * | 2/2010 | Werner | .................. | B62D 33/02 296/183.1 |
| 9,126,630 B1 * | 9/2015 | Gallagher | ............ | B62D 27/023 |
| 9,145,176 B1 * | 9/2015 | Van Wyk | ............. | B62D 29/008 |
| 9,162,715 B1 * | 10/2015 | Marchlewski | ....... | B62D 33/023 |
| 2006/0082191 A1 * | 4/2006 | McNulty | ................ | B62D 33/02 296/183.1 |
| 2007/0085381 A1 * | 4/2007 | Delaney | ................. | B62D 25/04 296/193.08 |
| 2007/0132278 A1 * | 6/2007 | Lester | .................. | B62D 29/043 296/191 |
| 2008/0258498 A1 * | 10/2008 | Philip | .................. | B62D 33/023 296/182.1 |
| 2010/0289289 A1 * | 11/2010 | Bator | ................. | B62D 33/0273 296/55 |
| 2015/0202950 A1 | 7/2015 | Garimella et al. | | |
| 2015/0367896 A1 * | 12/2015 | Marchlewski | .......... | E05B 79/02 296/183.1 |
| 2016/0288727 A1 * | 10/2016 | Sterling | ................. | B60R 9/065 |

* cited by examiner

*Primary Examiner* — Gregory Blankenship
(74) *Attorney, Agent, or Firm* — Jason Rogers; Brooks Kushman, P.C.

(57) ABSTRACT

A cargo box for a pickup truck includes a bed and a pair of sidewalls connected to opposing longitudinal sides of the bed. Each of the sidewalls has an inner panel and an outer panel. The outer panel has a wall portion, a lower portion, and an upper portion connected to the inner panel to join the inner and outer panels together. At least one brace is disposed in one of the sidewalls and includes a first flange connected to the upper portion, a second flange connected to the lower portion, and a third flange connected to an interior surface of the wall portion.

17 Claims, 3 Drawing Sheets

US 9,758,199 B1

STIFFENING BRACE FOR PICKUP TRUCK BOX OUTER PANEL

TECHNICAL FIELD

This disclosure relates to stiffening braces for reinforcing the outer panels of pickup-truck boxes.

BACKGROUND

Pickup trucks are motor vehicles with a rear open-top cargo area that is often referred to as a cargo box. The cargo box has a bed, opposing sidewalls, a header, and a tailgate. The box is attached to and supported by the chassis. The opposing sidewalls include inner and outer panels connected together along the top rail and at other selected locations to allow relative movement between the inner and outer panels. This leaves the large portions of outer panel unsupported, and the outer panel is self-supporting and relies on its own strength to resist panel deflections (such as oil canning), waviness, and other deformations. (Oil canning is when the panel elastically deflects inwardly in response to a force.) Traditional outer panels are formed from steel, which is able to resist panel deflections without the need for additional support structures within the sidewalls.

Pickup-truck boxes are being formed of aluminum alloys to improve vehicle performance and fuel economy. Aluminum alloy may have a higher strength-to-weight ratio than steel, and replacing steel with aluminum alloy offers the potential for weight reduction. The elastic modulus of aluminum is generally lower than the elastic modulus of steel. Thus, many fabrication techniques and joining methods that work well for steel parts do not work well for the same aluminum part. Due to these and other differences, simple material substitution does not necessarily produce an acceptable design.

Aluminum panels are more susceptible to oil canning than steel panels. Commercially viable aluminum panels must be resistant to oil canning and other panel deformation. This disclosure is directed to solving these and other problems associated with aluminum outer panels as will be described in more detail below.

SUMMARY

According to one embodiment, a cargo box for a pickup truck includes a bed and a pair of sidewalls connected to opposing longitudinal sides of the bed. Each of the sidewalls have an inner panel and an outer panel. The outer panel has a wall portion, a lower portion, and an upper portion connected to the inner panel to join the inner and outer panels together. At least one brace is disposed in one of the sidewalls and includes a first flange connected to the upper portion, a second flange connected to the lower portion, and a third flange connected to an interior surface of the wall portion.

According to another embodiment, a pickup-truck box includes a bed and a sidewall having an inner panel connected to a longitudinal side of the bed and an outer panel. The outer panel has a wall portion and a top portion extending inwardly from the wall portion to connect to the inner panel. A brace is disposed between the inner and outer panels and includes a first flange connected to the top portion and a second flange connected to the wall portion.

According to yet another embodiment, a sidewall of a pickup-truck box includes an inner panel connected to a bed and an outer panel spaced from the inner panel to define an interior. A top rail is connected between the inner and outer panels. A brace is disposed in the interior and includes an upper end connected to the top rail, an outer side connected the outer panel, and an inner side facing the inner panel and spaced apart from the inner panel.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
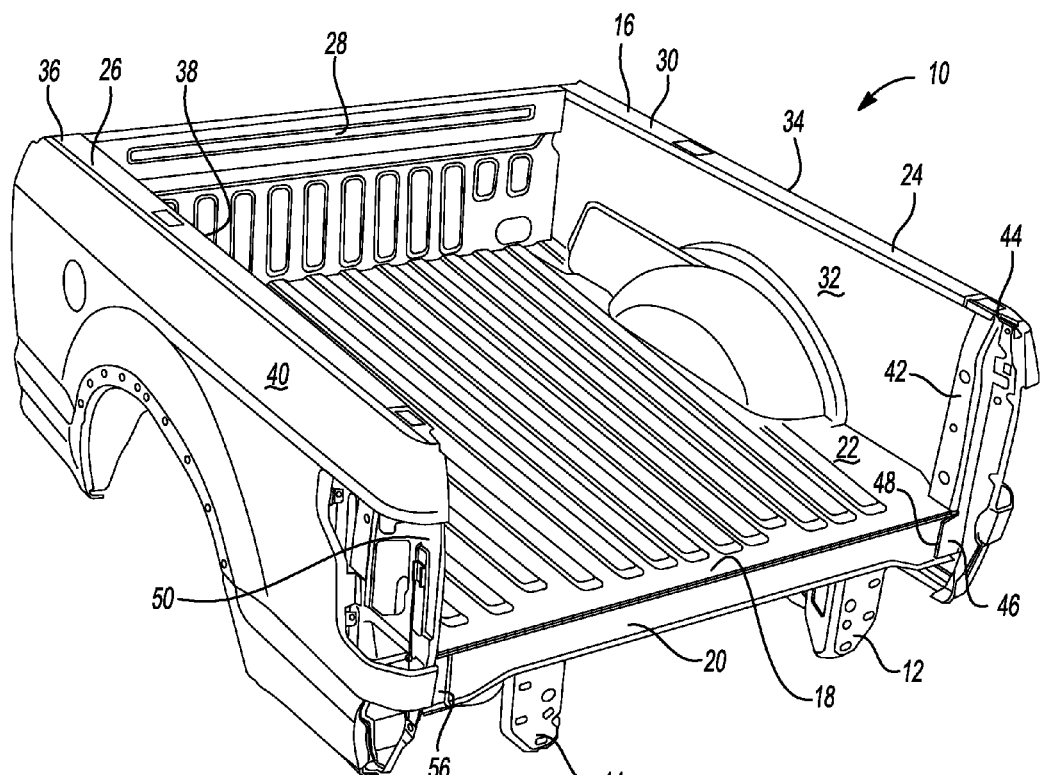
FIG. 1 is partial rear perspective view of a pickup truck.

FIG. 1 illustrates a rear portion of a pickup truck 10. The pickup truck 10 includes a frame having a first longitudinal frame rail 12 and a second longitudinal frame rail 14. The pickup truck 10 also includes a cargo box 16 supported by the first and second frame rails 12, 14. The box 16 includes a bed 18 having lateral support structures attached to the first frame rail 12 and the second frame rail 14 at a lower surface of the lateral support structures.

The bed 18 includes a rear sill 20 that defines a lower rear end of the bed 18. The rear sill 20 is attached to the first frame rail 12 and the second frame rail 14 at a lower surface of the rear sill. The bed 18 has a floor surface 22 attached to a top surface of the lateral support structures and a top surface of the rear sill 20. The lateral support structures and the rear sill 20 support the floor surface 22 and transfer loads from the floor surface 22 to the frame rails 12, 14. The box 16 includes a first sidewall 24 attached along a first longitudinal side of the bed 18 and a second sidewall 26 attached along a second longitudinal side of the bed 18. A header 28 is connected between the first and second sidewalls 24, 26 at a front portion of the box 16 near the cab. The box may be made of aluminum alloy, steel, or a composite material.

The first sidewall includes a top surface 30 (also known as a top rail), an inner panel 32, and an outer panel 34. The top surface 30 and the outer panel 34 may be integrally formed from a single sheet of metal. The first sidewall 24 also includes a first pillar 42 disposed between the inner panel 32 and the outer panel 34. The pillar includes a top end 44 and a bottom end 46. The bottom end 46 is attached to the rear sill 20 forming a first joint 48. The first pillar 42 transfers loads from the first sidewall 24 to the rear sill 20 through the first joint 48.

The second sidewall 26 includes a top surface 36 (also known as a top rail), an inner panel 38 and an outer panel 40. The top surface 36 and the outer panel 40 may be integrally formed from a single sheet of metal. The second sidewall 26 also includes a second pillar 50 disposed between the inner panel 38 and the outer panel 40. The second pillar 50 includes a top end and a bottom end. The bottom end is attached to the rear sill 20 forming a second joint 56. The second pillar 50 transfers loads from the second sidewall 26 to the rear sill 20 through the second joint 56.

The truck 10 includes a tailgate (not shown) pivotally attached to a rear end of the box 16 between the first sidewall 24 and the second sidewall 26. The tailgate includes a pair of opposing sides each having a lower pin. Each lower pin may be received in a corresponding sleeve in one of the first and second pillars 42, 50. The tailgate pivots between an open position and a closed position with the lower pins rotating within the sleeves. Each tailgate sidewall includes a latch disposed at an upper portion of the sidewall. The latch cooperates with a corresponding locking post connected to one of the first and second pillars 42, 50. The latch engages the locking post to secure the tailgate in the closed position. The tailgate also includes a handle operably connected with the latches to disengage the latches from the locking posts to open the tailgate.

Figure 2:
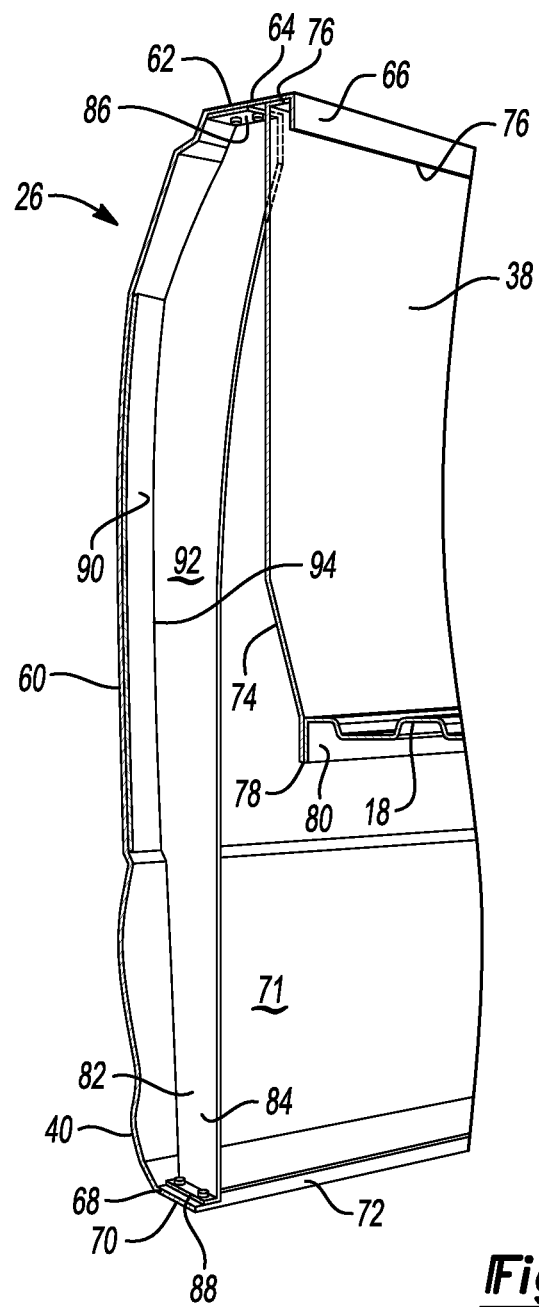
FIG. 2 is a rear perspective view of the left sidewall of the box shown in cross section.
Figure 3:
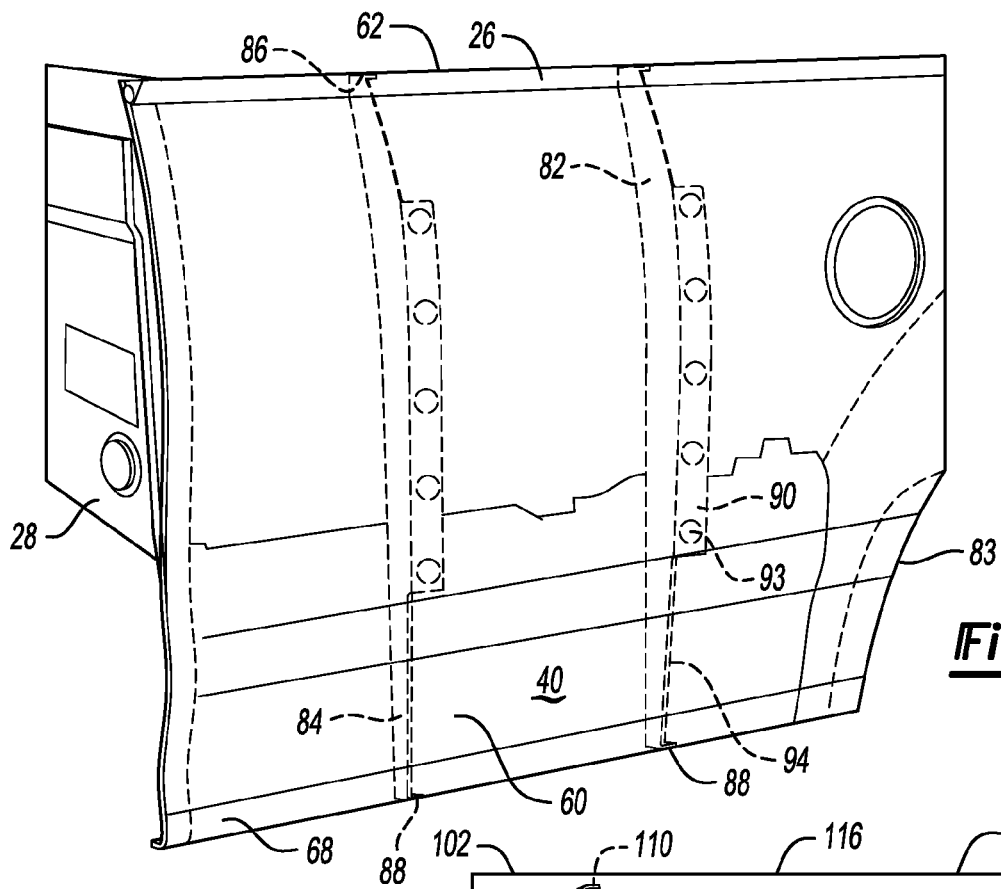
FIG. 3 is a partial front perspective view of the left sidewall.

Referring to FIGS. 2 and 3, the outer panel 40 includes a wall portion 60 that generally extends in an up-and-down direction, a top portion 62, and a bottom portion 68. The top portion 62 includes a horizontal segment 64 (which defines the top surface 36) that extends inwardly from the vertical portion 60 to a flange 66. The bottom portion 68 includes a horizontal segment 70 extending inwardly from the wall portion 60 to a flange 72 that extends upwardly from an inner side of the horizontal segment 70. The inner panel 38 includes a vertical portion 74 and a flange 76. The inner panel 38 connects to a flange 80 of the bed 18 at a lower end 78 of the inner panel. The flange 66 connects to the inner panel 38 joining the inner and outer panels together. The inner 38 and outer panels 40 may be connected using mastic in conjunction with welds, riveting, or other fasteners. The inner and outer panels must be joined in a way that permits relative movement between the inner and outer panels. Only joining the inner and outer panels at the top rail 36 and around the wheel wells allows for relative movement. Of course, other joining locations may be suitable, and this disclosure is not limited to only joining the panels at the top rails and wheel wells.

To satisfy customer expectations, the outer panels of the sidewall (which includes the class-A surfaces) must be resistant to deformations such as oil canning. The outer panels were traditionally made of steel. Steel panels, due to their inherent material properties, are fairly resistant to oil canning and no additional structure was needed to produce an acceptable outer panel.

To reduce vehicle weight, the box 16, which includes the outer panels 34 and 40, may be made of aluminum alloy such as 6000 series aluminum alloy. Aluminum alloy, due to its inherent material properties, is more susceptible to oil canning than steel panels. To prevent oil canning, the sidewalls include one or more braces 82 in select areas of the sidewall. FIGS. 2 and 3 and the associated text only describe the left sidewall 26 as having braces, however, the right sidewall may also include braces.

The braces 82 are longitudinally placed in the sidewall between the header 28 and the wheel well 83 and between the wheel well and the rear end of the sidewall. Each of the braces 82 includes a rib 84 having opposing major sides 92 and minor sides 94 that extend between the major sides. The major sides 92 have a larger surface area than the minor sides 94. The braces 82 may only be connected to the outer panel 40 permitting relative movement between the outer panel 40 and the inner panel 38. In most pickup trucks, attaching the brace between the inner and outer panel is problematic because they require relative movement between the inner and outer panels.

Each brace 82 includes an upper flange 86 connected to a top end of the rib 84 and a lower flange 88 connected to a bottom end of the rib. The upper flange 86 is connected to the top portion 62 of the outer panel 40, and the lower flange 88 is connected to the bottom portion 68 of the outer panel 40. The upper and lower flanges may be connected to the outer panel 40 by welds, rivets, bolts, screws, or adhesive. The brace 82 includes a middle flange 90 connected a minor side of the rib. The middle flange 90 connects the brace 82 to an interior surface 71 of the wall portion 60. The middle flange 90 may be bonded to the interior surface 71 using mastic 93 or other adhesive. The middle flange 90 and the rib 84 may be shaped to conform with the contours of the outer panel 40. The middle flange 90 may be generally rectangular and have an edge portion connected to the rib 84 with the flange 90 extending from one of the major sides 92 (as shown). Or, the middle portion of the flange 90 may be centered on the rib 84 with a portion of the flange 90 extending from both of the major sides 92.

The brace 82 may be made of metal alloy (such as aluminum alloy or steel), plastic, composite, or other suitable material. In some embodiments, the brace 82 is formed of the same material as the outer panel to match the thermal-expansion rates. When the expansion rates are different, visible deformations may occur in the panel if the brace is not designed to account for relative movement between the panel and the brace. In other embodiments, the brace and the outer panel may be made of different materials having a same or similar thermal-expansion rate. In yet another embodiment, the brace and panel may be formed of different materials with dissimilar thermal-expansion rates, and the brace is designed to permit relative movement between the panel and the brace.

Figure 4:
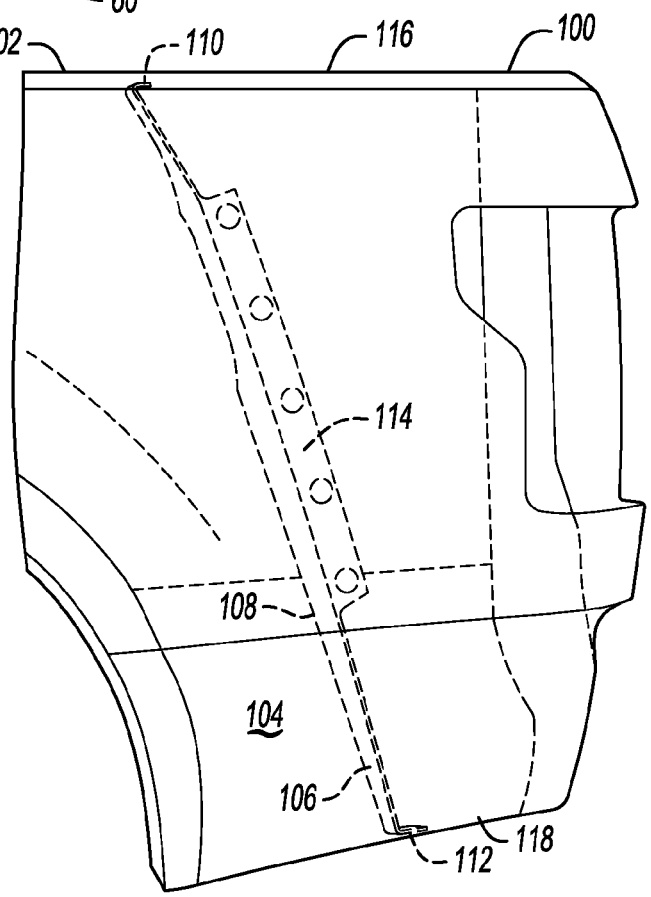
FIG. 4 is a partial perspective view of a box of a pickup truck according to an alternative embodiment.

The orientation of the braces can be at any angle suitable to prevent deflections and deformations of the outer panel. In some designs, having vertically oriented braces produces the best results. But, an oblique orientation of the braces may work best in other designs. FIG. 4 illustrates a truck box 100 having a sidewall 102 that includes an outer panel 104 reinforced with at least one oblique (or slanted) brace 106. The brace 106 includes a rib 108, an upper flange 110, a lower flange 112, and a middle flange 114. The upper and lower flanges are connected to the outer panel 104 with the rib 108 extending from the top portion 116 towards the bottom portion 118 at an oblique angle relative to the top portion. The middle flange 114 connects to the outer panel 104 to support the panel against deflections and deformations.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A cargo box for a pickup truck comprising:
   a bed;
   a pair of sidewalls connected to opposing longitudinal sides of the bed, each of the sidewalls including an inner panel and an outer panel, wherein the outer panel has a wall portion, a lower portion that is below the bed, and an upper portion connected to the inner panel to join the inner and outer panels together; and at least one brace disposed in one of the sidewalls and including a first flange connected to the upper portion, a second flange connected to the lower portion, and a third flange connected to an interior surface of the wall portion.

2. The cargo box of claim 1, wherein the brace further includes a rib extending between the first and second flanges and includes an outer minor side connected to the third flange.

3. The cargo box of claim 2, wherein the rib defines opposing major sides that extend from the outer minor side towards the inner panel.

4. The cargo box of claim 1, wherein the brace is only in contact with the outer panel.

5. The cargo box of claim 1, wherein the upper portion defines a top rail of the sidewall.

6. The cargo box of claim 1, wherein each of the sidewalls includes at least one brace.

7. The cargo box of claim 1, wherein the outer panel is formed of aluminum alloy.

8. The cargo box of claim 1, wherein the outer panel and the brace are formed of a same material.

9. A pickup-truck box comprising:
a bed;
a sidewall including an inner panel connected to a longitudinal side of the bed and an outer panel having a wall portion, a top portion extending inwardly from the wall portion to connect to the inner panel, and a bottom portion forming a bottom edge of the sidewall; and
a brace disposed between the inner and outer panels and including a first flange connected to the top portion, a second flange connected to the wall portion, and a third flange connected to the bottom portion.

10. The pickup-truck box of claim 9, wherein the brace defines an inner side that faces the inner panel and is spaced apart from the inner panel along an entire length of the inner side.

11. The pickup-truck box of claim 9, wherein the brace further includes a rib that extends between the first and third flanges and has an outer edge connected to the second flange.

12. The pickup-truck box of claim 11, wherein the rib further includes opposing major sides that are substantially perpendicular to the wall portion.

13. The pickup-truck box of claim 9, wherein the outer panel is formed of aluminum.

14. A sidewall of a pickup-truck box comprising:
an inner panel connected to a bed;
an outer panel spaced from the inner panel to define an interior;
a top rail connected between the inner and outer panels; and
a brace disposed in the interior and including an upper end connected to the top rail, an outer side connected the outer panel, and an inner side facing the inner panel and spaced apart from the inner panel.

15. The sidewall of claim 14, wherein the outer panel further includes a lower portion that extends inwardly towards the inner panel, and wherein the brace further includes a lower end connected to the lower portion.

16. The sidewall of claim 14, wherein the brace further includes opposing major sides extending between the outer side and the inner side, and wherein each of the major sides have a larger surface area than the outer side and the inner side.

17. The sidewall of claim 14 further comprising a second brace disposed in the interior and including an upper end connected to the top rail, an outer side connected the outer panel, and an inner side facing the inner panel and spaced apart from the inner panel.

* * * * *